Patented Jan. 16, 1951

2,538,735

UNITED STATES PATENT OFFICE 2,538,735

PREPARATION OF CRYSTALLINE AMMONIUM PENICILLIN

Murray Senkus, Terre Haute, Ind., assignor to Commercial Solvents Corporation, Terre Haute, Ind., a corporation of Maryland No Drawing. Application January 31, 1945, Serial No. 575,555

10 Claims. (Cl. 260—302)

This invention relates to a method for preparing pure penicillin material and more particularly to a method for preparing such pure penicillin material in the crystalline state in the form of its salts.

Penicillin is a metabolic by-product of the growth of molds such as *Penicillium notatum*, *Penicillium chrysogenum* and the like, when propagated on suitable nutrient media. It is formed in minute quantities in the nutrient culture liquor, in amounts of the order of a few thousandths of one per cent of the culture medium. The penicillin material thus produced has valuable antibiotic properties useful in combating many infections. When sufficiently concentrated and purified it may be administered therapeutically to humans to alleviate such infections. For therapeutic purposes, its purification and concentration need not be complete to the point of isolation of the pure material, and the penicillin material can advantageously be administered in relatively low concentrations of activity provided harmful, toxic and pyrogenic impurities are absent.

In such concentrated, but impure form, penicillin material is now produced commercially and is widely used therapeutically mainly in the form of its sodium salt in potency concentrations expressed in Oxford units of antibiotic activity of about 300 units or more per milligram of dried penicillin concentrate.

While the therapeutic administration of impure penicillin of concentrations in the range of 300 to 600 units per milligram has proved widely successful and beneficial, it would be desirable for many purposes, for example, for purposes of stability, high concentration of doses and the like, to obtain pure penicillin material free from the potentially toxic and unstabilizing impurities which resist removal according to the presently practiced commercial methods.

One of the most important advantages to be gained through the crystallization of penicillin, is the preparation of a stable product. In its impure form, associated with impurities of the type normally formed in the culture liquor and carried through the presently practiced purification steps along with the penicillin, the penicillin material is extremely unstable; in fact so unstable, that the dried product must be stored at low temperatures under refrigerated conditions, and even with such precautions, decomposition and destruction of its therapeutic activity occurs to such an extent that after a period of a few months it is no longer safe to rely on the effective activity of the material for therapeutic use, and any material not used within the period specified (as regulated by the Food and Drug Administration) must be discarded or reprocessed. On the other hand, crystalline penicillin material is stable under normal temperature conditions and can be stored in the dry state almost indefinitely without decomposition.

Since penicillin is usually administered in the form of its sodium salt, many of the major attempts to produce crystalline penicillin have been directed towards obtaining crystals of this salt directly from the impure commercial solutions now available. These attempts, as far as I am aware, have been unsuccessful, as have similar attempts to crystallize other salts such as the barium and calcium salts etc. which would be expected to be less soluble than the sodium salt and hence more easily crystallized.

From the known tendencies of ammonium salts to be generally extremely soluble, and hence infinitely more difficult to crystallize than the corresponding alkali and alkaline earth metal salts and from their known general instability, it was not to be expected that the crystallization of the ammonium salt of penicillin could be accomplished by any simple means adapted to commercial utilization.

I have now found, however, that crystalline penicillin material can be prepared by a commercially practicable means from crude impure solutions, in the form of the crystalline ammonium penicillin salt, by a method in which a crude dry ammonium penicillin concentrate is prepared, and the impure ammonium penicillin is thereafter dissolved in a solvent from which final crystallization of pure ammonium penicillin is effected. The pure crystalline ammonium penicillin may thereafter be converted to other metallic salts, particularly of those metals classified in subdivisions A of Groups I and II of the Periodic Classification of the elements such as sodium, potassium, lithium, calcium, strontium, barium, magnesium, and the like by any suitable method for replacing the ammonium radical with the desired positive radical, for example, resolution of the penicillin in organic solvents and reextraction with the desired soluble carbonate or hydroxide.

In carrying out my invention, I utilize any suitable crude organic solvent solution of impure penicillin acid material, such as the organic solvent extracts produced in large scale penicillin producing plants, or any organic solvent extract of crude penicillin material from which a portion of the culture liquor impurities has been removed as by known methods and, if necessary, after a preliminary further partial separation treatment to be described hereinafter, I convert the impure penicillin which exists as an acid in the organic solvent into the crude ammonium salt.

Sometimes certain materials are present in the organic solvent solutions which appear to inhibit subsequent crystallization of the product. The nature of these inhibiting materials is unknown, but they are resultants of the type of culture organism or culture medium used, or both, some organisms and media resulting in the production of these inhibiting materials, others producing liquors free from such materials. The term "impure penicillin," therefore, as used in the claims should be construed to include impure penicillin materials whose impurities are resultants of either or both of the above factors. Whatever these inhibiting materials may be, they are of the type removable by treatment of the organic solvent solution of penicillin material with an active carbon of the decolorizing type, or in some cases by selective adsorption in a chromatographic column, packed, for example, with certain grades of magnesium silicate. Since chromatographic extractions are tedious and ill adapted to large scale operations, I prefer to remove these crystallization inhibiting materials when they are present by treating the organic solvent solution of penicillin material with active carbon. This may be accomplished by treating the impure penicillin solution with active carbon, for example, by slurrying therewith, and filtering. The amount of carbon used is apparently not critical, additional amounts of carbon removing additional impurities, although some solutions may require treatment with larger quantities than others. More efficient removal of crystallization inhibitors is effected if the carbon is used in a series of 2 or 3 successive treatments and filtrations, although it may all be applied in one treatment if desired. After each filtration, the filter cake may be washed to assure maximum penicillin recovery.

After the preliminary separation treatment described, in which certain of the crystallization inhibitors have been removed, the treated organic solvent solution may be dried if desired, and may be concentrated by suitable means at this stage, for example, by evaporation or distillation or the like to remove the quantity of solvent necessary to effect the desired concentration, as well as to remove dissolved and entrained water.

I then accomplish the conversion of the penicillin material to the impure ammonium salt by any suitable means, for example, by treating the organic solvent extract with ammonium hydroxide in a quantity sufficient to convert the penicillin material to its ammonium salt, and then adding a quantity of water sufficient to insure a favorable distribution transfer of the penicillin ammonium salt from the organic solvent phase to the ammoniated water phase but small enough to insure a measure of additional concentration. After sufficient mixing to insure completeness of transfer of the penicillin ammonium salt to the aqueous phase, the two liquid layers are separated as by decantation, centrifugation, or the like. The resultant water solution of ammonium penicillin is then dessicated by suitable means such as by first freezing, and evaporating the water from the frozen state by high vacuum drying or the like; or, for example, by radionic drying from the liquid state by the application of high frequency electric current while subjecting the liquid to low pressures such as to prevent harmful temperature rises; or the ammonium penicillin solutions may be dried by a combination of the above or other suitable drying methods. The material is a substantially dry, concentrated, but still impure ammonium penicillin product.

As an alternative method for obtaining the crude dry ammonium penicillin product, I may convert the impure penicillin acid material in organic solvent solution to impure solid ammonium penicillin by first removing substantially all the water from the solution, as by distillation of the water and partial evaporation of the solution, if the characteristics of the solvent are such as to permit drying to be effected by this means, which serves also to partially concentrate the solution, then adding thereto dry ammonia either as a gas or dissolved in an inert carrier such as benzene, or mixed with an inert gas such as nitrogen, in an amount sufficient to form the ammonium salt with all or the desired quantity of the penicillin acid in the solvent. The impure ammonium penicillin is thus precipitated and may be separated from the solvent by any desired means such as filtration, decantation, centrifugation, or the like.

The concentrated dry impure ammonium penicillin product is next dissolved in a suitable solvent, and mildly heated, if necessary, to dissolve the salt. The solution is then allowed to cool, whereupon crystals of pure ammonium penicillin separate, and can be recovered by decantation, centrifugation, filtration, or the like.

The term "pure" as used herein to describe the crystalline penicillin salts of my invention, is not used in its absolute sense to designate a material completely free from all impurities. Accordingly, wherever the term "pure" appears as relating to "pure" penicillin salts, it should be construed as designating a purity at least sufficient to produce crystals having a purity of at least about 85% of the theoretical purity for the type of penicillin produced, as measured in terms of Standard units of penicillin activity per milligram of solids as assayed against the U. S. Food and Drug Administration standard established March 25, 1944 and based on crystalline penicillin G, sodium, having an arbitrarily ascribed activity of 1650 units per milligram of solids as determined by its inhibiting effect on the organism *Staphylococcus aureus*. The standard unit referred to, is an arbitrary unit established by the U. S. Food and Drug Administration. (A. C. Hunter and Wm. R. Randall "Standardization of Assay of Penicillin" J. Assoc. of Official Agricultural Chemists, August, 1944, pp. 430–438.) While this unit is not precisely the Oxford unit, it is so close to it as to be well within the experimental error of the assays used and for lack of a precise name, this unit is more or less universally referred to as synonymous with the Oxford unit.

The solvents suitable for effecting solution of the crude impure ammonium penicillin, and crystallization therefrom of pure ammonium penicillin include a wide variety of polar liquids such as water, alcohols, acetals, ketones, aldehydes, hydroxy ethers, hydroxy esters, cyclic ethers, and the like.

The ease with which solution and crystallization can be effected varies with the solvent used, and with the character of the impurities in the crude ammonium penicillin material, some solvents more readily dissolving the impure salt and more readily releasing the pure crystals at temperatures only slightly less than the solution temperature of the impure material, such that the crystallizations can be carried out merely by cooling to room temperatures. Other solvent solutions of crude ammonium penicillin require lower temperatures to bring about crystallization of pure ammonium penicillin, and for these, artificial cooling will be required. The ratio of solvent to crude ammonium penicillin will likewise vary with the solvent, water requiring a very high concentration of crude salt to cause effective crystallization of the pure ammonium penicillin.

While the various types of solvents described are satisfactory for use in my invention, because of the ease with which solution and crystallization can be effected therefrom, I prefer to use the alcohol solvents including those solvents which are strictly classified as alcohols, such as normal alcohols, secondary alcohols, tertiary alcohols, saturated and unsaturated alcohols, straight chain and cyclic alcohols and the like, and also those compounds which though not always strictly classified as alcohols, contain alcohol or hydroxy groups such as hydroxy esters, hydroxy ethers and the like. Therefore, wherever the term alcohol is used in the claims, it should be construed to include all the alcohol type compounds described above as well as the compounds usually included in the term alcohols.

Among the specific solvents which have been found effective in carrying out my invention there may be mentioned water, isopropyl alcohol, secondary butyl alcohol, methanol, ethanol, n-propanol, n-butanol, capryl or octyl alcohol, n-hexyl alcohol, 2-ethylhexyl alcohol, diethylcarbinol, acetone, methylethyl ketone, 1,4-dioxane, tertiary butyl alcohol, 1,3-dioxolane, dimethyl acetal, allyl alcohol, 2,2,4,5-tetramethyl-1,3-dioxolane, butyl lactate, 2-methyl-2,4-pentanediol, butyl Cellosolve, methyl levulinate, benzaldehyde, cyclohexanone, cyclohexanol, methylal and the like.

When the impure ammonium penicillin material is to be crystallized from organic solvents, these solvents should preferably be substantially dry in order to insure crystallization and maximum yields of the pure ammonium salt. Traces of water, however, do no harm, and the organic solvents which normally contain in the neighborhood of up to one percent or somewhat higher of dissolved water, may be used as such and need not be further dried to insure ready crystallization of pure ammonium penicillin therefrom in good yields.

The solvents of the character described all have adequate solubilizing characteristics for ammonium penicillin and the accompanying impurities to effect substantially complete solution of crude ammonium penicillin concentrates at normal room temperature or at mildly elevated temperatures, and yet possess solubilizing characteristics at slightly lower temperatures such that crystallization of only the pure penicillin therefrom will occur, leaving behind all the impurities which have tenaciously accompanied the penicillin material to this stage of its concentration.

In effecting crystallization of ammonium penicillin according to my invention I dissolve the crude, impure, dry ammonium penicillin concentrate, prepared for example as described above, preferably in the minimum quantity of solvent which will effect complete solution, for example, a quantity ranging up to about three times the weight of the dry crude ammonium penicillin concentrate dissolved. The solution is gently heated for a short time to a temperature high enough to effect complete solution of the ammonium penicillin concentrate without causing rapid penicillin decomposition. The solution is then cooled by any desired means such as by allowing it to stand at room or refrigerator temperatures, or by artificial cooling by means of water or ice baths. After the crystals have formed, they may be separated by decantation, filtration, centrifugation or other known methods and washed to remove adhering impurities if desired. Such crystals have an assay at least equivalent to about 85% or higher of theoretical purity for the particular penicillin obtained.

Once the pure ammonium salt has been obtained other metallic salts as described may readily be prepared therefrom by replacing the ammonium radical with the desired positive radical. This may advantageously be accomplished according to my invention by dissolving the pure ammonium penicillin in an aqueous solution maintained at a neutral pH, for example, a phosphate buffer comprising a mixture of the two potassium acid phosphates. This buffer solution may then be treated after acidification according to known methods with an organic solvent to dissolve the penicillin as penicillin acid, thus disposing of the ammonium radical. The organic solvent should preferably be one which is inert with respect to hydrolysis by the subsequently added hydroxide to prevent esterification or the like which may result in contamination of the penicillin product with extraneous solid materials. For this purpose chloroform is suitable as it is not only inert to the subsequently used bases but has also the required distribution ratio with respect to penicillin extraction. The organic solvent selected for use at this stage, as well as initially will be a solvent suitable to dissolve the type or types of penicillin desired. Thus if chloroform is used, only the varieties of penicillin which are soluble in this solvent will be recovered. If chloroform insoluble penicillin is desired, other solvents such as those known in the art, for example, amyl acetate, methyl isobutyl ketone and the like may be used to effect the conversion. The organic solvent solution of pure penicillin acid is then reextracted with an aqueous solution of the soluble metal carbonate or hydroxide whose salt is the desired end product. In this fashion it is a simple matter to prepare such pure penicillin salts including the sodium, potassium, barium, calcium, magnesium, etc., salts, by freezing the resulting aqueous salt solution and drying the material under vacuum from the frozen state, or by other suitable known methods. If desired, the resulting pure penicillin salt may be recrystallized from suitable solvents.

Example I

A thousand parts by volume of a crude solution of penicillin in amyl acetate obtained in plant extraction of penicillin culture liquor, and assaying 4,000 Oxford units activity per milliliter was slurried with 50 grams of active carbon, washed with amyl acetate, filtered and titrated with .12 normal ammonium hydroxide solution to a pH of 6.5, thus insuring conversion of all the penicillin acid to ammonium penicillin. Sufficient additional water was added to bring the total volume of aqueous solution added to 100 parts by volume, that is, 1/10 the volume of the original amyl acetate solution. The mixture was gently agitated for a half hour to insure complete transfer of the ammonium penicillin to the aqueous phase, and then the mixture was allowed to stand until two layers formed. These layers were separated by decantation. The aqueous layer was then frozen, and dried under vacuum from the frozen state and resulted in a dry ammonium penicillin concentrate weighing 4.1 grams and which assayed 558 Oxford units per milligram. The dried ammonium penicillin concentrate was dissolved in 8 ml. of isopropyl alcohol, heated to 50° C. to completely dissolve the concentrate, then allowed to cool to room temperature of about 25° C. Crystals of ammonium penicillin separated. These crystals were filtered, washed with 15 ml. of cold isopropyl alcohol. The crystals weighed .31 gram and were white needles and assayed 1700 Oxford units of penicillin activity per milligram.

Example II

A 4200 ml. portion of an amyl acetate extract of impure penicillin obtained in a plant extraction of penicillin culture liquor, and assaying 2600 Oxford units of penicillin activity per milliliter was slurried and filtered three times with 150 gram portions of active carbon (Darco G-60). Each time the filter cake was washed with a 600 ml. portion of fresh amyl acetate.

The final volume of the solution was 4500 ml. This solution was evaporated at reduced pressure and a temperature of between 30–40° C. over a period of about 6 hours to a volume of 2100 ml. The evaporated solution assayed 5300 Oxford units per ml. Into the partially evaporated amyl acetate solution 5 grams of dry ammonia gas was passed, whereupon a precipitate of impure solid ammonium penicillin formed. This precipitate was filtered, washed with one liter of petroleum ether and dried in air. The dry precipitate weighed 17.1 grams and assayed 540 units per milligram. Of this precipitate 16 grams were dissolved in a mixture of 20 ml. of secondary butyl alcohol and 12 ml. of isopropyl alcohol by heating the mixture to 70° C. for one-half minute. The solution was allowed to stand overnight in a refrigerator at about 0° C. whereupon the pure ammonium penicillin crystallized. The crystals were filtered and washed first with 20 ml. of secondary butyl alcohol then with 20 ml. of acetone. The washed crystals were then slurried in 5 ml. of acetone, filtered and dried. The crystals weighed 2.1335 grams and assayed 1700 units per milligram. This amounted to a conversion of 42.5% to the form of pure crystalline ammonium penicillin.

Example III

A 7480 ml. portion of an amyl acetate extract of impure penicillin material obtained in a plant extraction of penicillin culture liquor, and assaying 1850 Oxford units of penicillin activity per ml. was given three successive treatments with active carbon by adding 300 grams of carbon to the extract, stirring 15 minutes, filtering and washing with about 400–500 ml. of fresh amyl acetate. The resulting amyl acetate extract of penicillin material was dried and concentrated to 3740 ml. heating at about 30–40° C. to evaporate the water and part of the amyl acetate. To 1850 ml. of this dry extract, assaying 3700 Oxford units per ml. were added 2.5 grams of dry ammonia gas over a period of 5 minutes whereupon ammonium penicillin precipitated. The solid was filtered, washed with 500 ml. of petroleum ether and dried in air. The product weighed 10.1 grams and assayed 700 Oxford units per milligram. The dry impure ammonium penicillin was dissolved in a mixture of 12.5 ml. of secondary butyl alcohol and 10 ml. of isopropyl alcohol by heating to about 70° C. for about ½ minute, the solution was allowed to stand overnight in a refrigerator at about 0° C. whereupon pure ammonium penicillin crystallized. The crystals were filtered, washed with 10 ml. secondary butyl alcohol, then with 20 ml. acetone and dried in air. The crystals weighed 1.47 gms., and assayed 1700 Oxford units per milligram, corresponding to a conversion of 37.7% based on the original dry amyl acetate extract solution.

To a second 1850 ml. portion of the dry concentrated amyl acetate extract described above assaying 3700 Oxford units per ml., was added 300 ml. of a .4N solution of dry ammonia in benzene and stirred for one hour. Impure ammonium penicillin precipitated. This precipitate was filtered, washed and dried as above, and yielded 9.0 grams of impure ammonium penicillin assaying 735 Oxford units per milligram. The impure ammonium penicillin was dissolved in a mixture of 11.5 ml. of secondary butyl alcohol and 9 ml. of isopropyl alcohol by heating to about 70° C. for about one-half minute, and then allowed to stand overnight in a refrigerator at a temperature of about 0° C. whereupon pure ammonium penicillin crystallized. The crystals were filtered, washed with 10 ml. secondary butyl acetate then with 20 ml. acetone and dried in air. The crystals weighed 1.37 grams and assayed 1700 units per mg. corresponding to a conversion of 35.0%.

Example IV

A 2340 ml. portion of amyl acetate extract of impure penicillin material was treated successively as described above with three portions of active carbon using 150 grams per treatment. The treated extract was dried and concentrated in vacuo to 1640 ml. The partially purified, concentrated extract assayed 2100 Oxford units per ml. To this extract was added 1.5 grams of dry ammonia gas, whereupon impure ammonium penicillin precipitated. This was filtered, washed with 500 ml. of petroleum ether, and dried, yielding 8.25 grams of dry impure ammonium penicillin which assayed 355 Oxford units per milligram. The impure ammonium penicillin was dissolved in a mixture of 10 ml. secondary butyl alcohol and 8 ml. of isopropyl alcohol and allowed to crystallize as described in the previous examples. The crystals were filtered, washed with 7.5 ml. of secondary butyl alcohol and 20 ml. of acetone, dried in air, and yielded 0.57 gram of pure ammonium penicillin assaying 1700 units per mg. corresponding to a conversion of 33%.

Example V

A 1930 ml. portion of an amyl acetate solution of penicillin which had been previously treated with active carbon, dried and concentrated as described, and having an assay of 10,000 Oxford units of penicillin activity per ml., was treated with dry ammonia to precipitate crude ammonium penicillin. The crude ammonium penicillin was filtered, washed with 250 ml. of petroleum ether and dried in air. The crude ammonium penicillin weighed 28 grams and had a purity of 600 Oxford units of penicillin activity per mg.

One tenth gram portions of the above crude ammonium penicillin were mixed with 0.2 ml. portions of various solvents, dissolved by heating to about 75° C. for a few minutes and cooled to room temperature. The crude ammonium penicillin was found to be soluble in isobutyl alcohol, secondary butyl alcohol, normal butyl alcohol, ethanol, n-propanol, isopropanol, methylol, 1,4-dioxane, tertiary butyl alcohol, 1,3-dioxolane, dimethyl acetal, allyl alcohol, 2,2,4,5-tetramethyl-1,3-dioxolane, butyl lactate, 2-methyl-2,4-pentanediol, butyl Cellosolve, methyl levulinate, benzaldehyde, cyclohexanone, cyclohexanol, capryl alcohol, normal hexyl alcohol, 2-ethylhexyl alcohol, diethyl carbinol, acetone, methylethyl ketone, and methanol. Upon cooling crystals separated from all the solvents named.

*Example VI*

Of the crude ammonium penicillin prepared according to Example V, a 7 gram portion was dissolved in 20 ml. of n-butyl alcohol by heating to about 65° C. for a few minutes. The solution was placed in a refrigerator at 0° C. and allowed to remain at this temperature for thirty minutes whereupon crystals formed. The crystals were filtered, washed with 5 ml. of n-butyl alcohol, washed three times with 5 ml. portions of acetone and allowed to dry in air. The dry crystals weighed 0.9905 gram, and assayed 1785 units per mg. amounting to a conversion from crude to pure ammonium salt of 42% based on the penicillin activity.

*Example VII*

A 10 gram portion of crude ammonium penicillin prepared as described in Example V and assaying 720 Oxford units per mg. was recrystallized from 50 ml. n-hexyl alcohol according to the procedure previously described, and yielded 1.890 grams of pure ammonium penicillin assaying 1800 Oxford units per mg. amounting to a conversion of 46% of the penicillin activity.

*Example VIII*

A portion of 5.0006 grams of dry, solid crude ammonium penicillin prepared as described in the previous examples and assaying 645 Oxford units per mg. was dissolved in 18 ml. of 1,3-dioxolane by heating gently. The solution was allowed to stand for one-half hour in a refrigerator at 0° C. whereupon crystals formed. The crystals were filtered, washed with 2 ml. of 1,3-dioxolane, then with 5 ml. acetone, and dried in air for two hours. The dried crystals weighed 0.222 grams and assayed 1730 Oxford units per milligram, and amounted to a conversion of 12%.

*Example IX*

A 4.9925 gram portion of crude, dry ammonium penicillin prepared as described in previous examples and assaying 645 Oxford units per milligram was dissolved in 15 ml. of 1,4-dioxane by gentle heating. The solution was cooled by placing in a refrigerator at 10° C. for one-half hour, whereupon crystals formed. The crystals were filtered, washed with 2 ml. 1,4-dioxane and then with 5 ml. of acetone. The crystals were dried in air for 1 hour. The air dry crystals weighed 0.4177 gram corresponding to a conversion of 28%, and assayed 2090 Oxford units per milligram.

*Example X*

Pure ammonium penicillin was converted to pure sodium penicillin by the following procedure.

Eighty-two hundredths gram of pure ammonium penicillin was dissolved in 2 liters of phosphate buffer having a pH of 7. The buffer solution was cooled to 6° C., adjusted to a pH of 2.1 and 400 ml. of chloroform were added. The mixture was stirred for five minutes and the layers were separated. To the chloroform layer, now containing the penicillin was added with stirring, dropwise, a 1% NaOH solution sufficient to bring the pH to 7.5. Water was added to bring the total aqueous solution added to 40 ml. The mixture was stirred ½ hour, the layers separated, and the aqueous layer, containing the penicillin was frozen, and dried under vacuum from the frozen state resulting in pure sodium penicillin having an assay of 1500 Oxford units per milligram.

Pure sodium penicillin should assay 1650 units/mg. The sample was apparently contaminated with sodium bicarbonate resulting from the reaction of $CO_2$ of the air with the sodium hydroxide. This salt was reprocessed to remove the impurities and then assayed 1655 units/mg.

While the above describes the preferred embodiments of my invention it will be understood that departures may be made therefrom within the scope of the specification and claims.

What is claimed is:

1. In a process for preparing pure crystalline penicillin in the form of its ammonium salt from organic solvent solutions of impure penicillin material, the steps which comprise treating such a solution with an active carbon of the decolorizing type to remove impurities therefrom, thereafter adding ammonia, removing the organic solvent and preparing a substantially dry impure ammonium penicillin concentrate, dissolving said concentrate in a polar solvent selected from the group consisting of water, alcohols, ketones, aldehydes, acetals and cyclic ethers, and cooling said solution until pure ammonium penicillin crystallizes.

2. In a process for preparing pure crystalline penicillin in the form of its ammonium salt from organic solvent solutions of impure penicillin material, the steps which comprise treating such a solution with an active carbon of the decolorizing type to remove impurities therefrom, thereafter adding ammonia, removing the organic solvent and preparing a substantially dry impure ammonium penicillin concentrate, dissolving said concentrate in an alcohol solvent and cooling said solution until pure ammonium penicillin crystallizes.

3. In a process for preparing pure crystalline penicillin in the form of its ammonium salt from organic solvent solutions of impure penicillin material, the steps which comprise treating such a solution with an active carbon of the decolorizing type to remove impurities therefrom, thereafter adding ammonia, removing the organic solvent and preparing a substantially dry impure ammonium penicillin concentrate, dissolving said concentrate in a ketone solvent, and cooling said solution until pure ammonium penicillin crystallizes.

4. In a process for preparing pure crystalline penicillin in the form of its ammonium salt from organic solvent solutions of impure penicillin material, the steps which comprise treating such a solution with an active carbon of the decolorizing type to remove impurities therefrom, thereafter adding ammonia, removing the organic solvent and preparing a substantially dry impure ammonium penicillin concentrate, dissolving said concentrate in an acetal solvent, and cooling said solution until pure ammonium penicillin crystallizes.

5. In a process for preparing pure crystalline penicillin in the form of its ammonium salt from a solution of impure penicillin material in amyl acetate, the steps which comprise treating said impure organic solvent solution with active carbon of the decolorizing type, then adding ammonia, removing the amyl acetate and preparing from the partially purified solution a crude dry ammonium penicillin concentrate, dissolving said concentrate in a polar liquid selected from the group consisting of water, alcohols, ketones, aldehydes, acetals and cyclic ethers, and cooling said solution until pure ammonium penicillin crystallizes.

6. In a process for preparing pure crystalline penicillin in the form of its ammonium salt from a solution of impure penicillin material in amyl acetate, the steps which comprise treating such a solution with an active carbon of the decolorizing type to remove impurities therefrom, thereafter adding ammonia, removing the amyl acetate and preparing a substantially dry impure ammonium penicillin concentrate, dissolving said concentrate in an alcohol solvent, and cooling said solution until pure ammonium penicillin crystallizes.

7. In a process for preparing pure crystalline penicillin in the form of its ammonium salt from a solution of impure penicillin material in amyl acetate, the steps which comprise treating said impure organic solvent solution with active carbon of the decolorizing type to remove impurities, then adding ammonia, removing the amyl acetate and preparing a crude dry ammonium penicillin concentrate, dissolving said concentrate in a ketone solvent, and cooling said solution until pure ammonium penicillin crystallizes.

8. In a process for preparing pure crystalline penicillin in the form of its ammonium salt from organic solvent solutions of impure penicillin material, the steps which comprise treating such a solution with an active carbon of the decolorizing type to remove impurities therefrom, thereafter drying and concentrating the partially purified organic solvent solution of impure penicillin material; treating said dry concentrated impure penicillin material solution with dry ammonia gas to precipitate impure ammonium penicillin, drying said precipitate, dissolving said precipitate in a polar liquid selected from the group consisting of water, alcohols, ketones, aldehydes, acetals and cyclic ethers, and cooling until pure ammonium penicillin crystallizes.

9. In a process for preparing pure crystalline penicillin in the form of its ammonium salt from organic solvent solutions of impure penicillin material, the steps which comprise drying and concentrating the organic solvent solution of impure penicillin material, treating said dry concentrated impure penicillin material solution with dry ammonia gas to precipitate impure ammonium penicillin, drying said precipitate, dissolving said precipitate in a polar liquid selected from the group consisting of water, alcohols, ketones, aldehydes, acetals and cyclic ethers, and cooling until pure ammonium penicillin crystallizes.

10. In a process for preparing pure crystalline penicillin in the form of its ammonium salt from organic solvent solutions of impure penicillin material, the steps which comprise treating said organic solvent solution with an active carbon of the decolorizing type to remove impurities therefrom; thereafter extracting said partially purified organic solvent solution of impure penicillin material with an aqueous ammonium hydroxide solution, separating and freezing the said extract and drying the frozen extract under vacuum from the frozen state, dissolving said dry impure ammonium penicillin in a polar liquid selected from the group consisting of water, alcohols, ketones, aldehydes, acetals and cyclic ethers, and cooling until pure ammonium penicillin crystallizes.

MURRAY SENKUS.

REFERENCES CITED

The following references are of record in the file of this patent:

UNITED STATES PATENTS

| Number | Name | Date |
|---|---|---|
| 2,479,295 | Behrens | Aug. 16, 1949 |

FOREIGN PATENTS

| Number | Country | Date |
|---|---|---|
| 558,320 | Great Britain | 1943 |

OTHER REFERENCES

"Systematic Organic Chemistry," by Cumming, 1926, pp. 7–11.

Laboratory Technique, by Morton, 1938, pp. 147–164.

Lancet II, pp. 177–184, August 16, 1941.

Proc. Soc. Exp. Bio. and Med., June 1942, p. 279.

British Journal Exp. Pathology, vol. 23, June 1942, pages 103–115.

Science, pp. 20 and 21, vol. 96, No. 2479, July 3, 1942.

Coghill Report No. 12, May 3, 1943, page 3.

Coghill Report No. 14, Sept. 6, 1943, page 5.

Pfizer Report, Summary of Purification on the Penicillins up to December 24, 1943, page 4.

Pfizer Report, January 2, 1944, pp. 2 and 23.

Pfizer VIII, January 1944, pp. 1–6.

British Report XIX, January 14, 1944, pp. 3 and 4.

Scientific American, January 1944, "Speeding Penicillin," 1 page.

Pro. Soc. Exp. Bio. and Med., April 1944, pp. 246–247.

Penicillin, by J. R. Callahan, April 1944, Chem. and Met. Engineering.

Heyden Report, CMR—H, 4 pp. 1 and 2, June 15, 1944 (PB-80017).

The Chemistry of Penicillin, Princeton U. Press (1949), p. 89, (abstract of Merck Report for Oct. 1943, received OSRD, N. Y., December 30, 1943).